United States Patent
Haag et al.

(10) Patent No.: US 11,875,299 B2
(45) Date of Patent: Jan. 16, 2024

(54) APPARATUS FOR AND METHOD OF OPERATING A MEANS OF TRANSPORT

(71) Applicant: Robert Bosch GmbH, Stuttgart (DE)

(72) Inventors: Hans-Christian Haag, Stuttgart (DE); Markus Kromer, Renningen (DE); Peter Sanders, Karlsruhe (DE); Valentin Buchhold, Hamburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 150 days.

(21) Appl. No.: 17/219,087

(22) Filed: Mar. 31, 2021

(65) Prior Publication Data

US 2022/0051172 A1 Feb. 17, 2022

(30) Foreign Application Priority Data

Aug. 11, 2020 (EP) ..................... 20190372

(51) Int. Cl.
*G06Q 10/083* (2023.01)
(52) U.S. Cl.
CPC ................. *G06Q 10/083* (2013.01)
(58) Field of Classification Search
None
See application file for complete search history.

(56) References Cited

U.S. PATENT DOCUMENTS

| 10,133,995 | B1* | 11/2018 | Reiss | G06Q 50/12 |
| 2010/0205022 | A1* | 8/2010 | Brown | G01C 21/20 |
| | | | | 705/7.11 |
| 2014/0107921 | A1 | 4/2014 | Delling et al. | |
| 2016/0104112 | A1* | 4/2016 | Gorlin | G06F 16/29 |
| | | | | 705/338 |
| 2018/0308039 | A1* | 10/2018 | Nemati | G06N 5/022 |
| 2019/0220785 | A1* | 7/2019 | Tanno | G06Q 10/083 |
| 2019/0259082 | A1 | 8/2019 | Malewicz | |

FOREIGN PATENT DOCUMENTS

| CN | 109948874 A | * | 6/2019 |
| EP | 2757504 A1 | | 7/2014 |

OTHER PUBLICATIONS

Lerner, Jurgen et al., Algorithmics of Large and Complex Networks, 1973, pp. 117-139. (Year: 1973).*

* cited by examiner

*Primary Examiner* — Omar Zeroual
*Assistant Examiner* — Duane N. Moore
(74) *Attorney, Agent, or Firm* — NORTON ROSE FULBRIGHT US LLP; Gerard A. Messina (57) ABSTRACT

An apparatus for and a method of operating a fleet of vehicles. The apparatus provides a set of routes for moving entities of the fleet of vehicles, provides a request for at least two stops of an entity of the fleet of vehicles including at least one pick up location and at at least one drop off location, selecting a route from the set of routes for that a measure for a distance of one or more stops included in the request to the route meets a condition, inserting the at least one pick up location and at at least one drop off location as stops into the route and instructing to operate an entity according to the route.

19 Claims, 4 Drawing Sheets

APPARATUS FOR AND METHOD OF OPERATING A MEANS OF TRANSPORT

CROSS REFERENCE

The present application claims the benefit under 35 U.S.C. § 119 of European Patent Application No. EP 20190372.1 filed on Aug. 11, 2020, which is expressly incorporated herein by reference in its entirety.

FIELD

The present invention relates to an apparatus for and method of operating a means of transport (e.g., a fleet of vehicles).

The means of transport may be used for moving persons or goods. The means of transport may comprise entities for moving the subjects or goods.

When the transport of the persons or goods is subject to a constraint, it is desirable that the entities for transporting the persons or goods are moved in accordance with this constraint.

SUMMARY

A apparatus and an method according to example embodiments of the present invention move the entities efficiently and in accordance to the constraint.

In accordance with an example embodiment of the present invention, a method of operating a means of transport is provided which comprises providing a set of routes for moving entities of the means of transport, providing a request for at least two stops of an entity of the means of transport comprising at least one pick up location and at least one drop off location, selecting a route from the set of routes for that a measure for a distance of one or more stops included in the request to the route meets a condition, inserting the at least one pick up location and at least one drop off location as stops into the route and instructing to operate an entity according to the route. The means of transport can be used for moving a subject or an object from a pick up location to a drop off location. The means of transport may have a capacity for simultaneously moving a plurality of subjects and/or a plurality of objects. The transport of the plurality of subjects and/or the plurality of objects may require stopping at different pick up locations and/or drop off locations. A plurality of means of transport may be available for transporting the plurality of subjects and/or the plurality of objects. The operation of the plurality of means of transport may be subject to time constraints that define for a subject or an object a maximum waiting time from a demand for transport to a time of pick up. The method provides an improved mode of operating the means of transport. In a preferred aspect, instructing to operate an entity according to the route means that the entity is controlled depending on the route. In particular, the entity is controlled in such a way that it follows the route.

The measure for the distance is in one aspect a geometric distance to a segment of the route. The measure for the distance in one aspect may be a travel time. The measure for the distance in one aspect may be a travel distance.

Preferably, the condition is met when the measure for the distance for at least one stop is less than a threshold. The threshold may be defined by a characteristic of the route.

In one aspect of the present invention, the measure for the distance meets the condition when the stops are within a space defined over at least one dimension of the distance measure, wherein the space is bound by a threshold for the distance measure. The space defines a set of stops that are within a certain region around the route. The at least one dimension of the distance measure is a norm that defines the space.

In accordance with an example embodiment of the present invention, the method may comprise determining a first cost for inserting the at least two stops into the route, comparing the first cost to a second cost for inserting the at least two stops into another route and inserting the at least two stops into the route if the first cost is less than the second cost or inserting the at least two stops into the other route otherwise. When more than one route is available for inserting the at least two stops, a decision can be made based on the cost for inserting the at least two stops into the available routes.

In accordance with an example embodiment of the present invention, the method may comprise providing a weighted or an unweighted graph to represent network on which the means of transport is operating.

Weights may be determined by a travel characteristic, in particular a travel time, a travel distance, or a travel speed.

In accordance with an example embodiment of the present invention, the method may further comprise representing the network in the graph with contraction hierarchies.

In accordance with an example embodiment of the present invention, the method may further comprise representing the network in the graph with customizable contraction hierarchies, wherein weights of the graph or the graph is updated on basis of received travel data before or during processing a request, or on a regular time period basis, or on basis of changes of the weights.

Preferably, the method comprises providing the graph having vertices representing stops of the route in a contraction hierarchy, selecting a first vertex representing a first stop and a second vertex representing a second stop of the route, determining a third vertex representing the pick-up location or the drop off location in the contraction hierarchy, determining a first length of a first shortest distance path from the first vertex to a fourth vertex of the graph, determining a second length of a second shortest distance path from the fourth vertex to the third vertex, determining a third length of a third shortest distance path from the third vertex to a fifth vertex of the graph, determining a fourth length of a fourth shortest distance path from the fifth vertex to the second vertex, determining the measure for the distance depending on a sum of the first length, the second length, the third length and the fourth length.

In accordance with an example embodiment of the present invention, the method may comprise providing a first entry for a first bucket for the fourth vertex of the graph, the first entry comprising an identification of the first vertex and the length of the first shortest distance path, and providing a second entry for a second bucket for the fifth vertex of the graph, the second entry comprising an identification of the second vertex and the length of the fourth shortest distance path.

In accordance with an example embodiment of the present invention, the method may further comprise scanning the first bucket for a first entry for the first vertex, determining the first length depending on the first entry, scanning the second bucket for a second entry for the second vertex, determining the fourth length depending on the second entry.

In accordance with an example embodiment of the present invention, the method may comprise providing a capacity constraint for an entity moving on the route and either inserting the pick-up location into the route if the capacity of the entity meets the capacity constraint for at least the part of the route which is affected by inserting the pick-up location or not inserting the pick-up location otherwise.

In accordance with an example embodiment of the present invention, an apparatus for operating a means of transport is provided which is adapted to perform the steps of the example method(s).

Further advantageous embodiments of the present invention are derivable from the description below and the figures.

DETAILED DESCRIPTION OF EXAMPLE EMBODIMENTS

Figure 1:
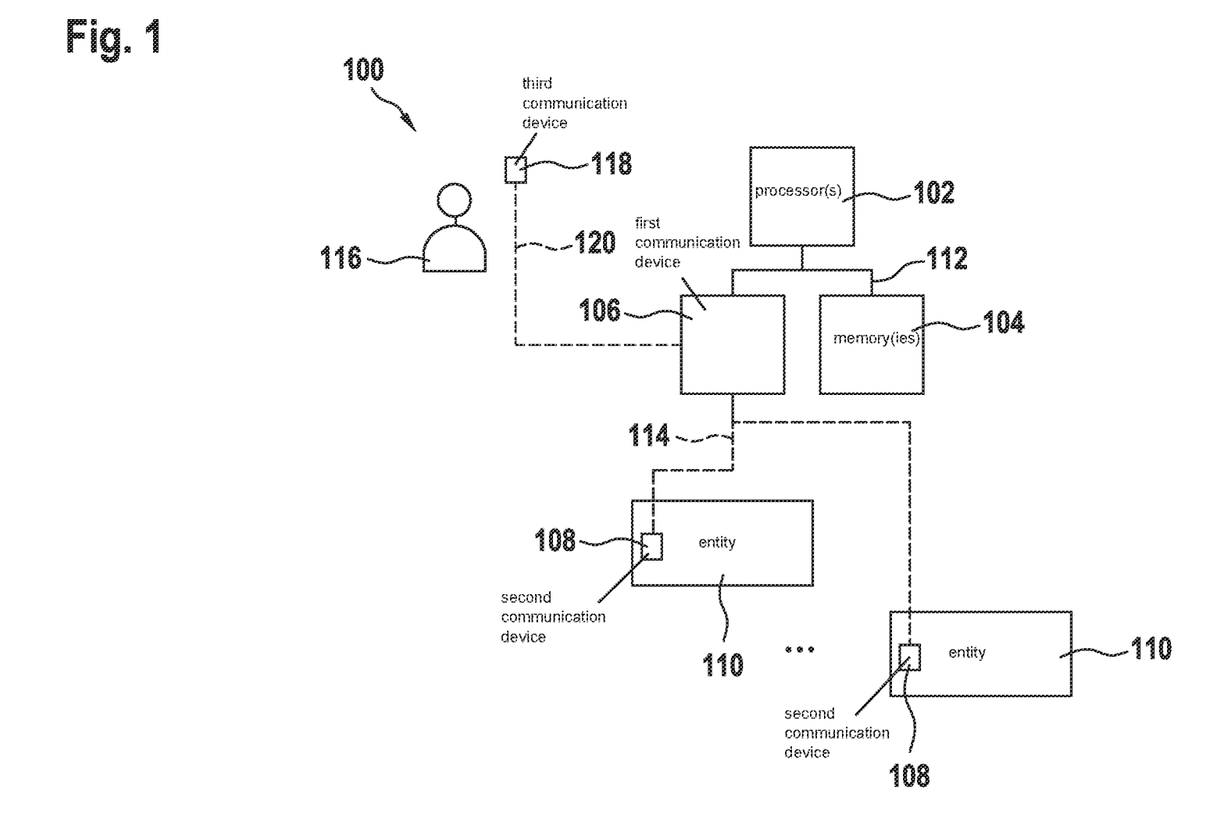
FIG. 1 depicts aspects of an apparatus for operating a means of transport, in accordance with an example embodiment of the present invention.

FIG. 1 depicts aspects of an apparatus 100 for operating a means of transport, in accordance with an example embodiment of the present invention. The apparatus 100 comprises at least one processor 102 and at least one memory 104. The at least one memory 104 in the example comprises instructions that when executed by the at least one processor 102 causes the apparatus 100 to execute steps of the method described below. The at least one processor 102 is adapted to communicate with the at least one memory 104 to execute the method. The apparatus 100 may comprises a first communication device 106. The first communication device 106 is adapted to communicate with a second communication device 108 of an entity 110 of the means of transport. The entity 110 may comprise a user interface for an operator of the entity 110 and/or a controller for controlling the entity 110. In the example, a plurality of entities 110 is depicted. The at least one processor 102 and the at least one memory 104 can be distributed, e.g., in a distributed computing environment.

In the example, a first data link 112 connects at least temporarily the processor 102 with the memory 104 and the first communication device 106. In the example, a second data link 114 connects at least temporarily the first communication device 106 and the second communication device 108 of at least one entity 110.

The entity 110 is adapted to move on a route provided by the apparatus 100. The entity 110 may have a capacity constraint.

A user 116 of the means of transport may request, e.g., via a third communication device 118, a transport by the at least one entity 110. The third communication device 118 may be a mobile phone or other mobile communicator. The first communication device 106 and the third communication device 118 in the example are adapted to communicate via a third data link 120. The user 116 may send a request r for a transport. The request r may comprise at least one pick up location p and at least one drop off location d.

Figure 2:
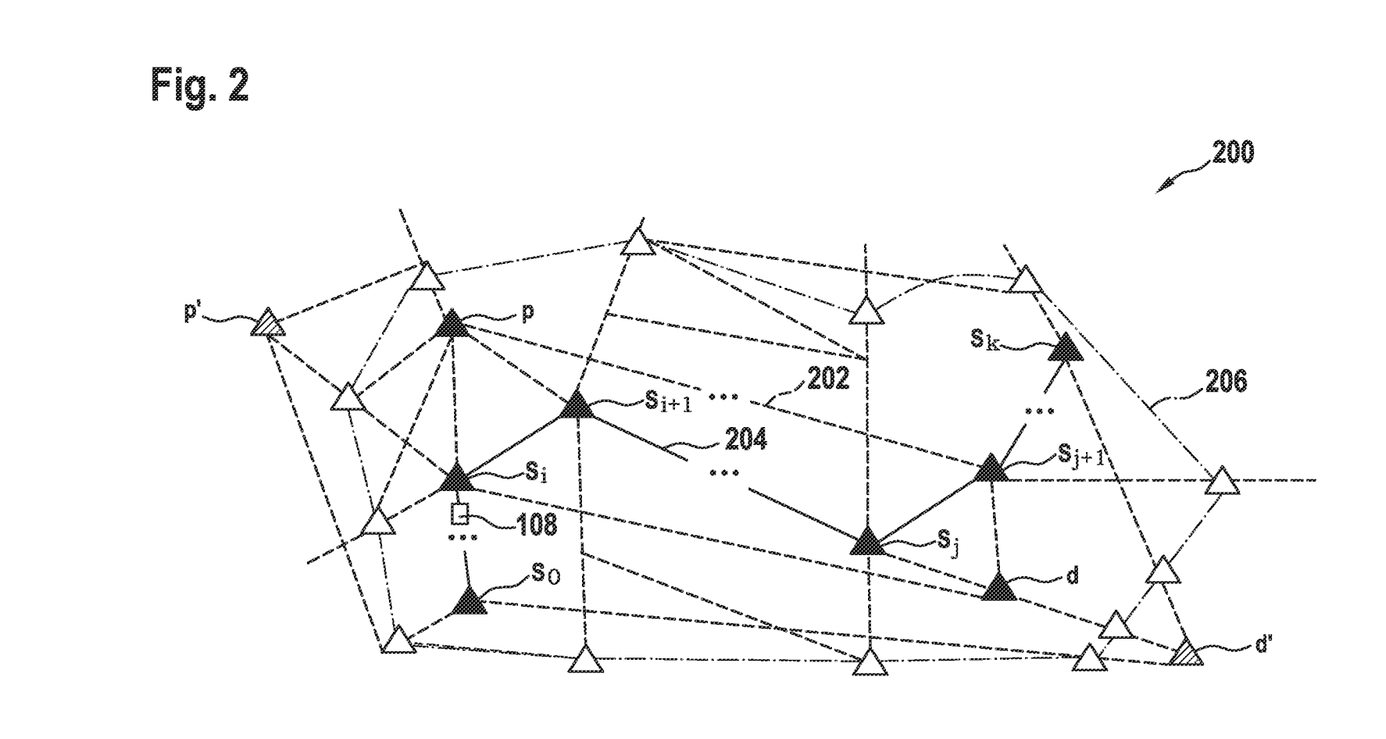
FIG. 2 depicts aspects of an infrastructure for the means of transport, in accordance with an example embodiment of the present invention.

FIG. 2 depicts aspects of an infrastructure 200 for the means of transport. In the example, the entity 110 is a vehicle and the means of transport comprises a fleet of vehicles operable to move on individual routes in a road infrastructure 202. In the road infrastructure 202, a route 204 of the entity 110 is depicted as solid lines. The route 204 in the example starts at an initial stop labelled $s_0$ and ends at a final stop labelled $s_k$. In the direction of travel, the route 204 passes a plurality of already planned stops. Not all of the stops are depicted in FIG. 2. The route 204 in the example includes in this order a first stop $s_i$, a second stop $s_{i+1}$ a third stop $s_j$ and a fourth stop $s_{j+1}$. There may be stops between second stop $s_{i+1}$ a the third stop $s_j$. The first stop $s_i$ may be the initial stop $s_0$. the fourth stop may be the final stop $s_k$. In the example, the second stop $s_{i+1}$ is consecutive to the first stop $s_i$. In the example, the fourth stop $s_{j+1}$ is consecutive to the third stop $s_j$. In a preferred embodiment, the entity 110 is an aircraft, in particular an airplane, a helicopter, a multicopter, an airship or a drone. In another preferred embodiment, the entity 110 is a watercraft, in particular a ship, a vessel or a drone. The aircraft and/or the watercraft can be manned as well as unmanned. In particular, it can be an aircraft and/or a watercraft for transporting goods.

The road infrastructure 202 may comprise a plurality of other roads that are not used for the route 204. These roads are depicted as dashed lines in FIG. 2. The stops depicted in FIG. 2 correspond to intersections of roads. Segments between the intersections correspond to road segments where the entity 110 can move.

A threshold 206 for a measure for a distance of intersections to the route 204 is schematically depicted in FIG. 2. The threshold 206 may be defined by a characteristic of the route 204. The characteristic may be a travel time or a travel distance. The travel time or the travel distance may be measured from individual of the stops of the route 204. The travel time or the travel distance may be measured to an intersection of a road starting at the individual stop and ending at the intersection.

In the example depicted in FIG. 2, a first request r comprises the pick up location p and the drop off location d that are located within the threshold 206. This means that a first detour that would be required to insert the pick-up location p and the drop off location d into the route 204 is short enough to meet a condition for inserting the pick-up location p and the drop off location d into the route 204. In another example depicted in FIG. 2, a second request r' comprises another pick up location p' and another drop off location d' that are both located outside of the threshold. This means that a second detour that would be required to insert the other pick up location p' and the other drop off location d' into the route 204 is too long to meet the condition. Thus, the route 204 is unsuitable for inserting the other pick up location p' and the other drop off location d' into the route 204.

In the example, a plurality of different entities 108 are assigned to a plurality of different routes. In this case the route that meets the condition is selected. A corresponding method from information about the stops and the travel time or travel distance between intersections of the road infrastructure is described below with reference to FIG. 3.

Figure 3:
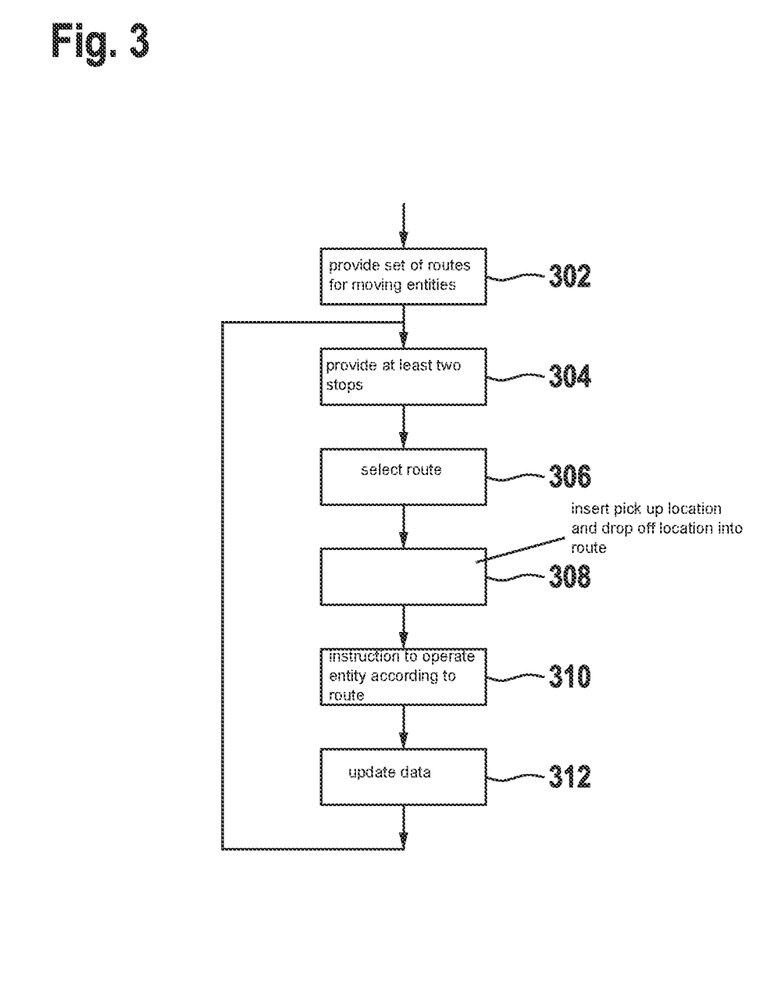
FIG. 3 depicts a method of operating the means of transport, in accordance with an example embodiment of the present invention.

The method comprises a step 302 of providing a set of routes for moving entities 108 of the means of transport. The routes may be provided from the at least one memory 104.

Afterwards, a step 304 is executed.

In the step 304, the method comprises providing a request for at least two stops of an entity 110 of the means of transport comprising at least one pick up location p and at at least one drop off location d. The request may be received in a corresponding notification from the third communication device 118.

Afterwards, a step 306 is executed.

In the step 306, the method comprises selecting a route 204 from the set of routes for that a measure for a distance of one or more stops included in the request to the route 204 meets a condition.

The distance may be a geometric distance to a segment of the route 204. The measure for the distance may be the travel time or the travel distance.

The condition is in one example met when the measure for the distance for at least one stop is less than the threshold.

The measure for the distance meets in one example the condition when the stops are within a space defined over at least one dimension of the distance measure. The space is limited by the threshold for the distance measure.

Afterwards a step 308 is executed.

The step 308 comprises inserting the at least one pick up location p and at at least one drop off location d as stops into the route 204.

Afterwards a step 310 is executed.

In the step 310, an operator of the entity 110 or the entity 110 is instructed to operate the entity 110 according to the route 204.

Afterwards the method may comprise a step 312 of updating data. This step may include, providing updated routes for the vehicles. Afterwards the step 304 is executed.

The method may compromise ignoring the request r in case no route can be selected. This may result in sending a corresponding notification to the third communication device 118.

The method may comprise selecting a subset of routes that meet the condition.

In case several routes are selected, the method may comprise determining a first cost for inserting the at least two stops into a first route of the subset, comparing the first cost to a second cost for inserting the at least two stops into a second route of the subset and inserting the at least two stops into the first route if the first cost is less than the second cost or inserting the at least two stops into the second route otherwise. The cost for inserting the at least two stops in one aspect refers to the cost for the route after inserting the at least two stops. The cost for inserting the at least two stops in another aspect refers to the cost for the detour resulting from inserting the at least two stops.

The method may comprise providing a capacity constraint for the entity 110. In this case, the method may comprise either inserting the pick-up location p into the route if the capacity of the entity 110 meets the capacity constraint for at least the part of the route which is affected by inserting the pick-up location p or not inserting the pick-up location p otherwise. In one example, the entity 110 is a vehicle capable to seat 5 persons. In this example, the capacity constraint is 5 persons. When the vehicle is moving with 4 persons on the route 204, a pick up is available for 1 person. If the request r comprises a demand for a pick up for 1 person and the drop off location d or another drop off location from another request is before the next already planned pick up location, this request r can be inserted into the route. The request r can in this example be inserted, if in addition the cost of the route 204 is less than the cost for other routes and the capacity constraint is met throughout the route 204.

Figure 4:
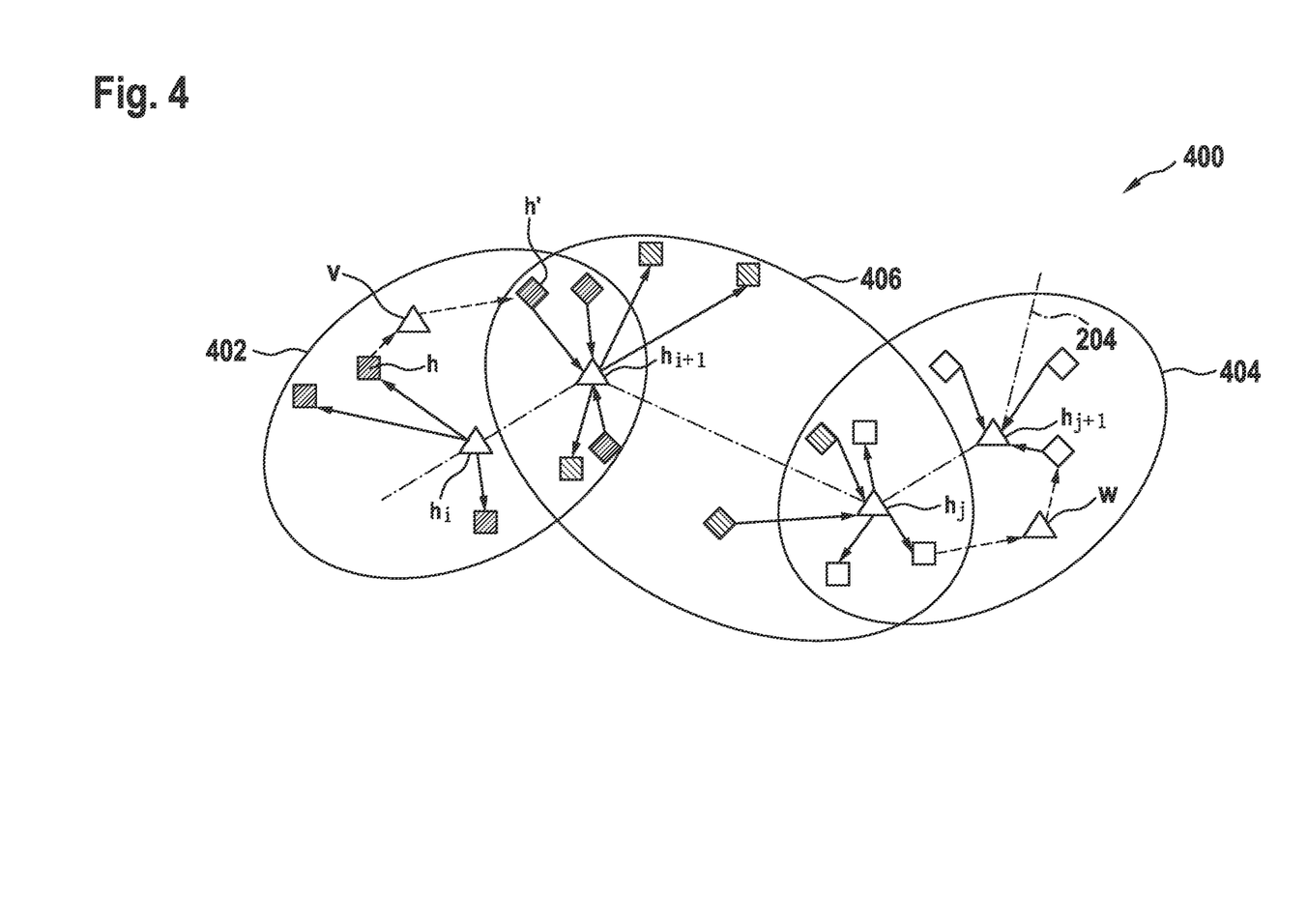
FIG. 4 depicts a graph representing routes, in accordance with an example embodiment of the present invention.

In another aspect depicted in FIG. 4, the route 204 is represented by vertices h and edges of a graph 400. In FIG. 4, a part of the graph 400 representing at least a part of the route 204 is depicted. In the example, the route 204 of the graph 400 is assigned to the entity 110 of the means of transport.

In the graph 400, a first vertex $h_i$, a second vertex $h_{i+1}$, a third vertex $h_j$ and a fourth vertex $h_{j+1}$ are depicted. In the example, the first vertex $h_i$ corresponds to the first stop $s_i$, the second vertex $h_{i+1}$ corresponds to the second stop $s_{i+1}$, the third vertex $h_j$ corresponds to the third stop $s_j$, and the fourth vertex $h_{j+1}$ corresponds to the fourth stop $s_{j+1}$.

A fifth vertex v represents the pick up location p and a sixth vertex w represents the drop off location d.

In this aspect the method comprises determining whether the measure for the distance of one or more stops included in the request to the route 204 meets the condition or not according to the following considerations.

The graph 400 may represent a road network. The graph 400 may represent the road network as a contraction hierarchy. A customizable contraction hierarchy may be used as well to update the weights of the graph e.g. travel times most efficiently and in parallel to the whole procedure after a first initialization phase.

For searching the route 204, a first bucket and a second bucket may be defined for each vertex h of the graph.

In FIG. 4 first buckets are source buckets and its entries are depicted as arrows with square heads. The second buckets are target buckets and its entries are depicted in FIG. 4 with diamond shaped tails. A leeway between two consecutive stops is shown as an ellipse. A first leeway for the case that the first vertex is $h_i$ and the second vertex is $h_{i+1}$ is depicted as a first ellipse 402. A second leeway for the case that the first vertex is $h_j$ and the second vertex is $h_{j+1}$ is depicted as a second ellipse 404. A third ellipse 406 for a third leeway is depicted for the segment between the vertices $h_{i+1}$ and $h_j$. The entries of buckets are assigned to different ellipses. The entries of buckets that are assigned to the same ellipse are depicted in FIG. 4 with the same pattern. In the example, for a request r=(p,d) the pick-up location p is to be inserted between $h_i$ and $h_{i+1}$ and the drop off location d is to be inserted between $h_j$ and $h_{j+1}$. The corresponding detour is depicted in FIG. 4 and includes the sections depicted as dashed arrows. The detour contains vertices that are assigned to buckets. Thus a search from the pick-up location p to a vertex with a source bucket containing an entry for the vertex $h_i$ or with a target bucket containing an entry for the vertex $h_{i+1}$ is sufficient to find information about the distance for this part of the detour. Thus a search from the drop off location d to a vertex with a source bucket containing an entry for the vertex $h_j$ or with a target bucket containing an entry for the vertex $h_{j+1}$ is sufficient to find information about the distance for this part of the detour.

In the graph 400 a backward contraction hierarchy search may be conducted from a vertex v representing the pick-up location p to the vertex $h_i$ representing the stop $s_i$. For a vertex h of the graph 400 that is passed in the search, its source bucket entry is scanned for an entry that comprises the stop $s_i$. When the source bucket comprises an entry for the stop $s_i$, the distance between the vertex h and the stop $s_i$ can be determined from the entry. This distance forms a first part of a detour that could be taken to pick up a request at the pick-up location p.

In the backward contraction hierarchy search the distance between the vertex h and the vertex v representing the pick-up location p is calculated. This distance forms a second part of the detour that could be taken to pick up a request at the pick-up location p.

A forward contraction hierarchy search may be conducted alike from the vertex v representing the vertex v representing the pick-up location p to a vertex $h_{i+1}$ representing the stop $s_{i+1}$. For a vertex h' of the graph that is passed in the search, its target bucket entry is scanned for an entry that comprises the stop $s_{i+1}$. In the forward contraction hierarchy search the distance between the pick-up location p and the vertex h' is calculated. This distance forms a third part of the detour that could be taken to pick up a request at the pick-up location p. When the target bucket comprises an entry for the stop $s_{i+1}$, the distance between the vertex h' and the stop $s_{i+1}$ can be determined from the entry. This distance forms a fourth part of the detour that could be taken to pick up a request at the vertex v representing the pick-up location p. The distance for a detour that could be taken to pick up a request at the pick-up location p may be determined as the sum of these four parts.

The distance of a detour that could be taken to drop off a request at the drop off location d is processed alike using searches from a vertex $h_j$ representing the stop $s_j$ and from a vertex $h_{j+1}$ representing the stop $s_{j+1}$.

The first ellipse 402 may be used to prune the search. This means that the contraction hierarchy search is bound to vertices that are within the first ellipse 402. To this end, a leeway is defined for the first ellipse 402 depending on an earliest departure time $t_{dep}^{min}$ at vertex $h_i$ and a latest time $t_{arr}^{max}$ for arriving at the vertex $h_{i+1}$:

$$\lambda(h_i,h_{i+1})=t_{arr}^{max}(h_{i+1})-t_{dep}^{min}(h_i)$$

Therefore, to compute a cost for detours, it is sufficient to consider the shortest paths from vertex $h_{i+1}$ to the vertex v representing the pick-up location p. To limit the search space, the vertex v is considered when it meets the following condition and is not considered otherwise:

$$dist(h_i,v)+dist(v,h_{i+1})\leq\lambda(h_i,h_{i+1})$$

The bucket entries that are necessary and sufficient for the reverse bucket contraction hierarchy search from v to find the needed distances meet the following condition:

For a vertex h of the graph 400, there is an entry $(h_i,d_{h_i}(h))$ in the source bucket $B_s(h)$
(a) if h is a highest ranked vertex on all shortest paths between $h_i$ and h; and
(b) if $d_{h_i}(h)+dist(h,h_{i+1})\leq\lambda(h_i,h_{i+1})$.

To efficiently check the conditions (a) and (b), source bucket entries are created by running a forward contraction hierarchy search. In the example, the source bucket entry $(h_i,d_{h_i}(h))$ is created by running a forward contraction hierarchy search from $h_i$ and inserting, for each vertex h that is settled, an entry $(h_i,d_{h_i}(h))$ into $B_s(h)$. The case of target bucket entries is processed alike.

To check condition (b), in the example the distance $dist(h,h_{i+1})$ is determined for each vertex h in the search space of the forward search.

In one aspect, firstly, a topological forward contraction hierarchy search is executed from $h_i$, which processes vertices in topological order rather than in increasing order of distance.

In this aspect the search is pruned at any vertex with a distance label greater than a threshold. In the example above, the threshold is the leeway $\lambda(h_i,h_{i+1})$. In this example, stall-on-demand is not applied.

The search stops in this example when its priority queue becomes empty.

Afterwards, a reverse contraction hierarchy search is executed in the example from $h_{i+1}$. In this example stall-on-demand is applied and the search is stopped as soon as the minimum key in its priority queue exceeds the threshold, e.g. the leeway $\lambda(h_i,h_{i+1})$.

Finally, in this aspect the distance labels of the reverse search are propagated down into the search space of the forward search.

To this end, each vertex settled during the forward search may be pushed onto a stack. After the reverse search repeatedly a vertex u may be popped from the stack. For each upward edge (u,u') out of the vertex u, a distance $d_{h_{i+1}}(u)=\min(d_{h_{i+1}}(u),l(u,u')+d_{h_{i+1}}(u'))$ may be determined. The distance $d_{h_{i+1}}(u)$ refers to a distance label from a backward search starting at the vertex $h_{i+1}$. This way $d_{h_{i+1}}(h)=dist(h,h_{i+1})$ is determined, when the stack becomes empty, for each vertex h in the search space of the forward search with $d_{h_i}(h)+dist(h,h_{i+1})\leq\lambda(h_i,h_{i+1})$, and thus can check condition (b).

To check condition (a) a vertex h in the search space of the forward search is considered. Let P be a shortest of the paths from $h_i$ to h that contain only upward edges.

Condition (a) is violated if and only if there is an up-down path P' from $h_i$ to h with at least one downward edge and a length $l(P')\leq l(P)$.

To check this, when a vertex h is popped from the stack, additionally all downward edges (h'',h) into h are looked at to compute a value $$\mu=\min_{h'',h}d_{h_i}(h'')+l(h'',h).$$

If $\mu<d_{h_i}(h)$ the condition (a) is violated, and thus we do not insert an entry into $B_s(h)$.

Either way, $d_{h_i}(h)$ may be set to $d_{h_i}(h)=\min(d_{h_i}(h),\mu)$.

Whenever an entity completes a stop, the bucket entries referring to this stop may be removed. In the following, the removal of entries from source buckets that refer to the stop represented by vertex $h_i$ is explained. To this end, a set R of reached vertices and a queue Q with a location $l(h_i)$ of $h_i$ is initialized. While Q is not empty, a vertex h is extracted from the queue and its source bucket $B_s(h)$ is scanned. When an entry $(h_i,d_{h_i}(h))$ referring to $h_i$ is found, $(h_i,d_{h_i}(h))$ is removed from $B_s(h)$, the scan is stopped, and for each upward edge h,h'' out of h, h'' is inserted into both R and Q if h''∉R.

The algorithm above finds an entry $(h_i,d_{h_i}(h''))\in B_s(h'')$ if and only if there is a path P between h and h'' such that P contains only upward edges and $(h_i,d_{h_i}(h))\in B_s(h)$ for each vertex h on P.

In one aspect, whenever an entry is inserted into a source bucket $B_s(h'')$, also a corresponding entry is inserted into the source bucket of the parent vertex on the path from $h_i$ to h'' in the graph 400 $B_s(parrent(h''))$ where parrent(h'') is a parent pointer of h'' computed by the forward search.

The same processing and conditions can be used for other stops, for the second ellipse 404 or the third ellipse 406 and for the vertex w representing the drop off location d. The case of target bucket entries is equivalently processable.

Bucket entries have to identify the stop they refer to. Therefore, an initially empty list of free stop IDs may be maintained. Whenever a stop is inserted into an entity's route, a stop ID may be taken from the list and assigned to the new stop. If the list is empty, the stop ID of the new stop may be set to the maximum stop ID assigned so far plus one. Whenever a stop is removed from a route, its stop ID may be inserted into the list of free stop IDs. Bucket entries are stored and maintained in a way similar to how we handle stop attribute values.

In this aspect, the method comprises in step 306
determining a length of a shortest distance path from the third vertex v in a backward contraction hierarchy search to the first vertex $h_i$, determining a length of a shortest distance path from the third vertex v in a forward contraction hierarchy search to the second vertex $h_{i+1}$, and determining the measure for the distance depending on a sum of these length and the length.

To speed up the search further, the method may comprise in step 312 providing a first entry for a source bucket for a vertex h, and providing a second entry for a target bucket for a vertex h'.

The first entry in this aspect comprising an identification of the first vertex $h_i$ representing the first stop $s_i$ and the first shortest distance path length $dist(s_i,h)$. The second entry comprising an identification of the second vertex $h_{i+1}$ representing the second stop $s_{i+1}$ and the second shortest distance path length $dist(s_{i+1},h')$.

Furthermore, the method may comprise in step 306 scanning the source bucket for an entry for the first stop $s_i$, determining the first shortest distance path length $dist(s_i, h)$ depending on the entry for the first stop $s_i$, scanning the target bucket for an entry for the second stop $s_{i+1}$, determining the fourth shortest distance path length $dist(s_{i+1},h)$ depending on the entry of the second stop $s_{i+1}$.

A routine for resolving a received request $r=(p,d,t_{dep}^{min})$ is described below with reference to a pseudo code.

In the example, the request $r=(p,d,t_{dep}^{min})$ includes an earliest departure time $t_{dep}^{min}$. The earliest departure time $t_{dep}^{min}$ is a time that defines an earliest time to pick up the request r up at the pick-up location p. The route of an entity e is referred to as R(e) in the following.

The following additional model parameters are used:

a maximum waiting time $t_{wait}^{max}$, a first trip time parameter $\alpha$, and a second trip time parameter $\beta$.

The method considers a plurality of entities $e \in C$ of a set C of entities e. The capacity of $e \in C$ is denoted as $c(e)$. The capacity at a stop $s_i$ is denoted $o(s_i)$. A present position of a specific entity $\hat{e}$ is denoted $l_c(\hat{e})$. A location of a specific stop $s'_0$ is denoted $l(s'_0)$.

The maximum waiting time $t_{wait}^{max}$ in this example defines a latest departure time $t_{dep}^{max}$ at that the entity must leave at the pick-up location p. In addition, the earliest departure time $t_{dep}^{min}$ defines a latest time $t_{arr}^{max}$.

The routine determines an insertion $\iota=(e,r,i,j)$ for the request r. The index i identifies the segment of the route 204, between the stops $s_i$ and $s_{i+1}$. The index j identifies the segment of the route 204, between the stops $s_j$ and $s_{j+1}$.

```
1   run a contraction hierarchy search from the pick-up location p to the drop off location d.
2   t^max_dep(r) ← t^min_dep(r) + t^max_wait
3   t^max_arr(r) ← t^min_dep(r) + α · dist(p, d) + β
4   run forward and reverse bucket contraction hierarchy searches from the pick-up location
    p, and the drop off location d.
5   let î = ( ê, r, î, ĵ ) ← ⊥ be the best insertion found so far
6   for each entity e ∈ C do
7     let (s_0, ..., s_k) be the route 204 of the entity e
8     for i ← 1 to k - 1 do
9       if o(s_i) = c(e) then continue
10      try to improve î with insertion (e, r, i, j)
11      for j ← i + 1 to k - 1 do
12        if o(s_j) = c(e) then
13          if l(s_j) = d then
14            try to improve î with insertion (e, r, i, j)
15            break
16        try to improve î with insertion (e, r, i, j)
17  for each entity e ∈ C do
18    try to improve î with any insertion (e, r, 0, j) with 0 ≤ j < |R(e)| - 1
19  search for insertions better than î inside the pick-up at the end of a route
20  search for insertions better than î inside the drop off at the end of a route
21  if no feasible insertion has been found then return ⊥
22  let (s_0, ..., s_k) be the route 204 of entity ê
23  (s'_0, ..., s'_i, = p, ..., s'_j, = d ... s'_k,) ← perform insertion î
24  if entity ê is diverted while drifing from s_0 to s_1 then
25    remove source bucket entries for stop s'_0
26    l(s'_0) ← l_c(ê)
27    t^min_dep(s'_0) ← current point in time
28    generate source bucket entries for stop s'_0
29  if the pick-up location p is not inserted at an existing stop then
30    generate source bucket and target bucket entries for stop s'_i,
31  if the drop off location d is not inserted at an existing stop then
32    generate target bucket entries for stop s'_j,
33  if the drop off location d is inserted before the final stop s_k then
34    generate source bucket entries for stop s'_j,
35  else
36    generate source bucket entries for the final stop s_k
37  if l(s_k) ≠ l(s'_k,) then
38    remove ê from a list of vehicles that terminate at l(s_k)
39    insert ê into a list of vehicles that terminate at l(s'_k,).
40  return î.
```

In lines 1 to 4 the routine computes shortest path distances. More specifically, the shortest path distance $dist(p,d)$ from the pick-up location p to the drop off location d is computed with a contraction hierarchy search. From this distance $dist(p,d)$ the latest time $t_{arr}^{max}(r)$ when the request r should be dropped off is calculated. The latest time $t_{dep}^{max}(r)$ when the request r should be picked up is computed.

Furthermore, the shortest-path distances that are needed to calculate the costs of ordinary insertions are calculated. Ordinary insertions are insertion (e,r,i,j) with $0<i\leq j<|R(e)|-1$. To this effect, two forward bucket contraction hierarchy searches are executed that scan the target buckets. One forward bucket contraction hierarchy search is executed from the pick-up location p and one from the drop off location d. Furthermore, two reverse bucket contraction hierarchy searches are executed that scan the source buckets. One reverse bucket contraction hierarchy search is executed from the pick-up location p and one from the drop off location d. An entry to the bucket may contain an identifier of an entity to which the entry belongs.

With respect to line 4, reference is made to FIG. 4 and the explanation of the forward and reverse bucket contraction hierarchy searches from the pick-up location p and the drop off location d explained above.

In the example a first forward search is conducted from vertex v to vertex $h_{i+1}$ and a first reverse search is conducted from vertex v to $h_i$. In the example a second forward search is conducted from vertex w to vertex $h_{j+1}$ and a second reverse search is conducted from vertex w to $h_j$.

In lines 5 to 16 the routine is trying ordinary insertions. The set C of entities $e \in C$ contains the entities e that have been seen while scanning the source and/or target buckets.

Note that entities e that are not contained in the set C allow no feasible ordinary insertions, and thus not have to be considered during this phase of the algorithm.

For each entities $e \in C$, all ordinary insertions are enumerated that satisfy the capacity constraints using the occupancy values $o(\cdot)$.

To this end, in the example, for each stop $s \in R$ on each vehicle route R, its occupancy $o(s)$, e.g. a number of occupied seats, is maintained, when the entity e departs from stop s.

Whenever a request r is inserted into an existing or already planned route $\langle s_0, \ldots, s_k \rangle$, this yields a modified route $\langle s'_0, \ldots, s'_i = p, \ldots, s'_j = d \ldots s'_{k'} \rangle$. If $s'_{i'}$ was not present before the insertion, the calculation includes setting $o(s'_{i'}) = o(s'_{i'-1})$. If $s'_{j'}$ was not present before the insertion, the calculation includes setting $o(s'_{j'}) = o(s'_{j'-1})$. The calculation further includes looping over all $s'_l$, $i' \leq l < j'$ and incrementing $o(s'_l)$.

Multi passenger or good requests may be processed alike.

Furthermore, the routine loops over all pick-up insertion points i, $0 < i < k$, in increasing order and checks if insertions with respect to the capacity constraint are infeasible. If the insertions are infeasible, the routine continues with the next pick-up insertion point. Otherwise, the routine loops over all drop-off insertion points j, $i \leq j \leq k$ in increasing order and checks if the insertion satisfies the capacity constraints or not. If the insertion doesn't satisfy the capacity constraint, the insertions with $l > j$ are infeasible, and the routine continues with the next pick-up insertion point. Note that the insertion with $l = j$ satisfies the constraints only if the drop off point d coincides with $s_j$.

For an insertion i satisfying the capacity constraint, the routine checks whether remaining hard constraints are also satisfied and computes the insertion cost according to the following objective function:

$$f(\iota) = \delta + \gamma_{wait} \max(t_{dep}p(r) - t_{dep}^{max}(r), 0) + \gamma_{trip} \max(t_{arr}d(r) - t_{arr}^{max}(r), 0)$$

where $t_{dep}p(r)$ is the departure time at the pick-up location p(r) for the processed request r, where $t_{arr}d(r)$ is the arrival time at the drop off location d(r) for the processed request r, where $\delta$ is a detour of the entity due to the request r, where $\gamma_{wait}$ and $\gamma_{trip}$ are model parameters.

The goal is to insert the request into any entities route such that the entities detour $\delta$ is minimized. The detour $\delta$ may be defined by an increase in operation time. Whenever a request r is received, the goal is to find the insertion $\iota$ into any entities route that minimizes $f(\iota)$. A check that the solution to the goal meets the constraints is computable in constant time e.g. using the following routine:

For stops $s \in R$ a departure time $t_{dep}^{min}(s)$ at stop s is maintained when no further stops are inserted into the route R. Furthermore a latest arrival time $t_{arr}^{max}(s)$ at stop s is maintained so that all following pick-ups and drop-offs are on time.

For the modified route $\langle s'_0, \ldots, s'_i = p, \ldots, s'_j = d \ldots s'_{k'} \rangle$ the routine loops over all $s'_l$, $i' \leq l \leq k'$ in forward order and sets $$t_{dep}^{min}(s'_l) = t_{dep}^{min}(s'_{l-1}) + \text{dist}(s'_{l-1}, s'_l) + t_{stop}$$

$$t_{arr}^{max}(s'_{i'}) = t_{dep}^{max}(r') - t_{stop}$$

$$t_{arr}^{max}(s'_{j'}) = t_{arr}^{max}(r')$$

These constraints are propagated to the preceding stops by looping over all $s'_l$, $0 < l \leq j'$ in reverse order and setting $$t_{arr}^{max}(s'_l) = \min(t_{arr}^{max}(s'_l), t_{arr}^{max}(s'_{l+1}) - \text{dist}(s'_l, s'_{l+1}) - t_{stop})$$

The detour $\delta$ is computable as detour $\delta = \delta_p + \delta_d$ where $\delta_d$ is the detour due to the drop off and $\delta_p$ is the detour due to the pick up.

$$\delta_p = \text{dist}(s_i, p) + t_{stop} + \text{dist}(p, s_i + 1) - \text{dist}(s_i, s_{i+1})$$

$$\delta_d = \text{dist}(s_j, d) + t_{stop} + \text{dist}(d, s_{j+1}) - \text{dist}(s_j, s_{j+1})$$

In the example an insertion then satisfies all service, waiting and trip time constraints if and only if $$t_{dep}^{min}(s_{i+1}) - t_{stop} + \delta_p \leq t_{arr}^{max}(s_{i+1}) \text{ and}$$

$$t_{dep}^{min}(s_{j+1}) - t_{stop} + \delta_p + \delta_d \leq t_{arr}^{max}(s_{j+1}) \text{ and}$$

$$t_{dep}^{min}(s_k) + \delta_p + \delta_d \leq t_{serv}^{max}(e)$$

wherein $t_{serv}^{max}(e)$ is the maximum service end time for the entity e.

In lines 17 to 20, the routine tries special case insertions. These are insertions that have costs that depend on shortest-path distances not computed by the bucket contraction hierarchy searches.

Firstly, insertions (e,r,i,j) that insert the pick-up location p before the next scheduled stop on an entities route are considered with (e,r,0,j) with $0 \leq j < |R(e)| - 1$. If the capacity constraint is violated, the entity cannot pick up another request before the next scheduled stop.

Secondly, insertions that are better than a currently best insertion $\iota$ are searched that insert both the pick-up location p and the drop-off location d after the final stop on an entities route. This is done by performing a reverse Dijkstra search from the pick-up location p.

Thirdly, insertions that are better than a currently best insertion $\iota$ are searched that insert the drop-off location d after the final stop on an entities route. This is done by performing a reverse Dijkstra search from the drop off location d.

The routine uses bucket contraction hierarchy searches to obtain most of the shortest-path distances needed to compute insertion costs.

The following three cases may be treated separately.

A first case considers an insertion (e,r,i,j) with i=0<k, i.e. an insertion of the pick-up location p before the next already scheduled stop of the entity e on the route $\langle s_0, \ldots, s_k \rangle$.

In this case the routine computes the cost of the insertion depending on the shortest-path distance $dist(l_c(e),p(r))$ from a current location $l_c(e)$ of the entity e to the pickup spot p(r).

The travel time from $s_0$ to $s_1$ via the pick-up location p(r) is $dist(s_0,l_c(e))+dist(l_c(e),p(r))+dist(p(r),s_1)$. A triangle inequality $dist(s_0,p(r)) \leq dist(s_0,l_c(e))+dist(l_c(e),p(r))$ then yields a lower bound of $dist(s_0,p(r))+dist(p(r),s_1)$ on the travel time from $s_0$ to $s_1$ via the pick-up location p(r). Since source bucket entries for $s_0$ and target bucket entries for $s_1$ are available, this lower bound may be obtained from the bucket contraction hierarchy searches.

The routine then computes the lower bounds on the pick-up detour and finally on the cost of the insertion. Only in the rare case that the latter lower bound is better than the best insertion seen so far, the routine computes the exact shortest-path distance $dist(l_c(e),p(r))$ by running a contraction hierarchy search.

A second case considers an insertion (e,r,i,j) with i=k, i.e. an insertion of the pick-up location p after the last already scheduled stop of the entity e on the route $\langle s_0, \ldots, s_k \rangle$. In the example, instead of computing the cost of this insertion, a shortest-path distance $dist(s_k, p(r))$ from the last stop $s_k$ to the pick-up location p(r), the routine may defer such insertions. After possible candidate insertions are processed, the routine may perform a reverse Dijkstra search from the pick-up location p(r). Whenever the reverse Dijkstra search settles a final stop $s_k$ of a route for any of the entities e, the routine may check whether the insertion of the pick-up location p(r) and the drop off pick-up location d(r) after the last stop improves the currently best insertion. The cost for inserting increases in this case the operation time as well. The cost for such insertion is at least $$\delta = dist(s_k,p(r))+t_{stop}+dist(p(r),d(r))+t_{stop}$$

In one aspect, the routine may maintain a priority queue. The priority queue may comprise a minimum key κ. The routine may stop the reverse Dijkstra search for the best insertion as soon as a sum $\kappa+t_{stop}+dist(p(r),d(r))+t_{stop}$ is at least as large as the cost of the best insertion found so far. In another aspect, the cost of the best insertion found so far may be compared to the sum $$\kappa+t_{stop}+dist(p(r),d(r))+t_{stop}$$

$$+\gamma_{wait} \max(\kappa+t_{stop}-t_{wait}^{max},0)$$

$$+\gamma_{trip} \max(\kappa+t_{stop}+dist(p(r),d(r))-t_{trip}^{max}(r),0)$$

In this aspect, the reverse Dijkstra search is stopped if the sum is at least as large as the cost of the currently best insertion.

Stopping the Dijkstra search early makes it practical and fast enough for real-time applications.

A third case considers an insertion (e,r,i,j) with i<j=k, i.e. an insertion of a pick-up location p(r) before a final stop $s_k$ and an insertion of a drop off location after the final stop $s_k$.

After running a Dijkstra search from p(r), the routing may also run a reverse Dijkstra search from the drop off location d(r). Whenever the final stop $s_k$ of an entity e is settled, the routine checks if any insertion with i<k improves the best insertion so far. Considering that the cost of each such insertion is at least $dist(s_k,p(r))+t_{stop}$, the routine may stop the Dijkstra search when a sum $\kappa+t_{stop}$ is at least as large as the cost of the best insertion found so far. κ refers to the minimum key in the priority queue. The routine may be improved by checking a lower bound on the violation of the trip time constraint. This means the search is stopped as soon as the sum $$\kappa+t_{stop}+\gamma_{trip} \max(t_{stop}+\kappa-t_{trip}^{max}(r),0)$$

is at least as large as the cost of the best insertion found so far.

In lines 22 to 39 the routine updates preprocessed data.

The data is updated in the example if a feasible insertion is found.

To this end, the best insertion $\hat{\imath}$ is performed into the current route $\langle s_0, \ldots, s_k \rangle$.

After the insertion, the parameters $t_{dep}^{min}$, $t_{arr}^{max}$, and o(•) are updated.

In case the entity ê is diverted while driving from $s_0$ to $s_1$, the routine updates the start $s_0$ and recomputes the source bucket entries for $s_0$.

In this case there are no target bucket entries for $s_0$ because it is the first stop on the route. Firstly, the routine removes the current entries for $s_0$ in the first bucket. Then, the routine sets the location of $s_0$ to the current location of the entity ê, and the departure time at $s_0$ to the current point in time. Finally, the routine generates new source bucket entries for $s_0$.

Moreover, the routine generates source bucket and target bucket entries for the stop at which the pickup is made unless the pickup is inserted at an existing stop.

Likewise, the routine generates target bucket entries for the stop at which the drop-off is made unless the drop-off is inserted at an existing stop. If the drop-off is inserted before the final stop $s_k$, the routine also generates source bucket entries for the stop at which the drop-off is made unless the drop-off is inserted at an existing stop. Otherwise, the routine generates source bucket entries for the final stop $s_k$ that was at the very end of the route before performing the insertion.

The routine may remove the target bucket entries for a stop, whenever an entity e reaches the next scheduled stop on its route. The routine may remove the source bucket entries for the stop preceding this stop as well.

The routine may maintain for each vertex v, a list of entities e that terminate at the vertex w, i.e., whose currently last stop $s_k$ corresponds to the vertex w. The routine may remove the entity e from the list of entities terminating at the final stop $s_k$, and insert the entity e into the list of entities terminating at the location of the new last stop.

To meet additional requirements of real-world production systems the routine may be extended by various extensions. In the following, extensions are explained separately. These extensions can be combined in an actual implementation.

In one aspect, it is assumed that stops are made at vertices of the graph that correspond to intersections in a road network. In real-world applications, however, stops may be made anywhere along road segments. In the graph, road segments correspond to edges. To work with edge-based stops, it is considered that a stop s along an edge $z=(h_i,h_{i+1})$ of length l(z) has a real-valued offset $0 \in [0,1]$. To run a forward Dijkstra search, a forward contraction hierarchy search or a forward bucket contraction hierarchy search from s, the routine starts from the vertex $h_{i+1}$ and initializes a first distance label $d_{h_{i+1}}(h_{i+1})$ to $(1-0) \cdot l(z)$ rather than zero. Likewise, to run a reverse Dijkstra search, a reverse contraction hierarchy search or a reverse bucket contraction hierarchy search from s, the routine starts from the vertex $h_i$ and initialize a second distance label $d_{h_i}(h_i)$ to $0 \cdot l(z)$. A case where a source and a target are located along the same edge is treated explicitly by the routine.

In real-world applications, one is often interested not only in the best insertion (e,r,i,j) but also in a description of the paths from the stop $s_i$ to the pick-up location p(r), from the pick-up location p(r) to the stop $s_{i+1}$, from the stop $s_j$ to the drop-off location d(r), and from the drop-off location d(r) to the stop the stop $s_{j+1}$. By maintaining a parent pointer for each vertex, the Dijkstra searches can retrieve a complete path description, and the contraction hierarchy searches can retrieve path descriptions that potentially contain shortcuts. The latter can be unpacked into the complete path description.

Considering a path s, ..., h, ..., s' found by a forward bucket contraction hierarchy search, and considering that h is the highest ranked vertex on this path, a description of a first part s, ..., h of the path is found in the forward bucket contraction hierarchy search. A second part h, ..., s' of the path is hidden in a bucket. For a reverse bucket contraction hierarchy search, the description of the second part corresponds to the target bucket entry.

In one aspect, the routine may store the search space when generating bucket entries for s'. The search space may be stored as rooted tree. The routine may traverse the rooted tree from h, ..., s' to retrieve the description of the second part h, ..., s' of the path.

Note, however, that to find a best insertion, no parent information and hence no rooted tree is needed. That is, the rooted tree is needed optionally, when we insert a new stop immediately before s'.

In another aspect, the path description may be retrieved that corresponds to a bucket entry $(s',d_{s'}(h))$ by running a reverse contraction hierarchy search from s' to h when needed.

To handle traffic, the graph may be updated whenever new traffic information is available. On large-scale road networks, however, contraction hierarchy preprocessing may be not fast enough to incorporate a continuous stream of traffic information. Therefore, the routine described above may be combined with customizable contraction hierarchies.

More specifically, each customizable contraction hierarchy is a contraction hierarchy. To improve the search further, the Dijkstra-based contraction hierarchy searches may be replaced by elimination tree searches. Elimination tree search is a query algorithm tailored to search in customizable contraction hierarchies. Elimination tree searches tend to be faster than Dijkstra-based searches for point-to-point queries. Elimination tree searches do not process vertices in increasing order of distance. In order to stop Elimination tree searches early, the stopping criteria for the Dijkstra-based contraction hierarchy searches may be turned into a pruning criteria for elimination tree searches.

To this end, during bucket entry generation, the Dijkstra-based contraction hierarchy searches stop as soon as they settle a vertex whose distance label exceeds the threshold. While an elimination tree search may not be stopped at such a vertex as well, the elimination tree search may be pruned at this vertex. This means, that edges out of this vertex are not relaxed.

Furthermore, elimination tree searches may simplify bucket entry generation. Since elimination tree searches process vertices in ascending rank order, and the rank order is a topological order, a standard elimination tree search is already a topological search.

The objective function $f(t)$ is an example for a transport simulation. The objective function can be parameterized in various ways. The routine is not restricted to this objective function but is capable of working with other functions as well. In particular elliptic pruning and therefore bucket entry generation does not depend on the objective function, only on the constraints for requests r that are already matched to an entity e. Hence, the routine will perform similarly for any objective function. In the example, the criteria that depend on the actual objective function are the stopping criteria for the reverse Dijkstra searches from the received pickup and drop-off spot, respectively. Other criteria are independent of the actual objective function in this example.

What is claimed is:

1. A method of operating a plurality of autonomous transport vehicles, the method comprising:
   providing, via a processor, a set of routes for moving entities of the plurality of transport vehicles, wherein the set of routes is provided from a memory coupled to the processor;
   providing a request for at least two stops of an entity of the plurality of autonomous transport vehicles, the at least two stops including at least one pick up location and at least one drop off location;
   selecting, via the processor, a route from the set of routes so that a measure for a distance of one or more stops of the at least two stops included in the request to the route meets a condition;
   inserting, via the processor, the at least one pick up location and the at least one drop off location as stops into the route;
   determining, via the processor, instructions to operate the entity of the plurality of autonomous transport vehicles according to the route; and
   operating, via the processor, the entity of the plurality of autonomous transport vehicles according to the route;
   wherein the processor is couplable via a first data link with a first communication device,
   wherein the first communication device is couplable via a second data link with a second communication device of the entity of the plurality of autonomous transport vehicles,
   wherein a user of the entity of the at least one transport vehicle makes the request with a third communication device, wherein the first communication device is couplable via a third data link with the second communication device of the entity of the plurality of autonomous transport vehicles, and
   wherein the entity includes a user interface for an operator of the entity and/or a controller for controlling the entity, and
   wherein the first data link connects at least temporarily the processor with the memory and the first communication device, and wherein the second data link connects at least temporarily the first communication device and the second communication device of the entity, and
   wherein a shortest path distance from the pick-up location to the drop off location is computed with a contraction hierarchy search, wherein from the computed shortest path distance a latest time when the request is to be dropped off is calculated, and wherein a latest time when the request is to be picked up is computed.

2. The method of claim 1, wherein the plurality of autonomous transport vehicles is a fleet of vehicles, and the moving entities are vehicles of the fleet of vehicles.

3. The method according to claim 1, wherein the measure for the distance is a geometric distance to a segment of the route.

4. The method according to claim 1, wherein the measure for the distance is a travel time.

5. The method according to claim 1, wherein the measure for the distance is a travel distance.

6. The method according to claim 1, wherein the condition is met when the measure for the distance for at least one stop of the one or more stops is less than a threshold.

7. The method according to claim 6, wherein the threshold is defined by a characteristic of the route.

8. The method according to claim 1, wherein the measure for the distance meets the condition when the stops are within a space defined over at least one dimension of the distance measure, wherein the space is bound by a threshold for the distance measure.

9. The method according to claim 1, further comprising:
determining a first cost for inserting the at least two stops into the route;
comparing the first cost to a second cost for inserting the at least two stops into another route; and
inserting the at least two stops into the route when the first cost is less than the second cost or inserting the at least two stops into the other route otherwise.

10. The method according to claim 1, further comprising: providing a weighted or an unweighted graph to represent network on which the plurality of autonomous transport vehicles is operating.

11. The method according to claim 10, wherein the weights are determined by a travel characteristic, the travel characteristic including a travel time, or a travel distance, or a travel speed.

12. The method according to claim 10, further comprising: representing the network in the graph with contraction hierarchies.

13. The method according to claim 12, further comprising: representing the network in the graph with customizable contraction hierarchies, wherein weights of the graph or the graph is updated based on received travel data before or during a processing a request, or on a regular time period basis, or on basis of changes of the weights.

14. The method according to claim 10, further comprising:
providing the graph with vertices representing the stops of the route in a contraction hierarchy;
selecting a first vertex of the vertices representing a first stop and a second vertex of the vertices representing a second stop of the route;
determining a third vertex representing the at least one pick-up location or the at least one drop off location in the contraction hierarchy;
determining a first length of a first shortest distance path from the first vertex to a fourth vertex of the vertices of the graph;
determining a second length of a second shortest distance path from the fourth vertex to the third vertex;
determining a third length of a third shortest distance path from the third vertex to a fifth vertex of the vertices of the graph;
determining a fourth length of a fourth shortest distance path from the fifth vertex to the second vertex; and
determining the measure for the distance depending on a sum of the first length, the second length, the third length and the fourth length.

15. The method according to claim 14, further comprising:
providing a first entry for a first bucket for the fourth vertex of the graph, the first entry including an identification of the first vertex and the length of the first shortest distance path; and
providing a second entry for a second bucket for the fifth vertex of the graph, the second entry including an identification of the second vertex and the length of the fourth shortest distance path.

16. The method according to claim 15, further comprising:
scanning the first bucket for a first entry for the first vertex;
determining the first length depending on the first entry;
scanning the second bucket for a second entry for the second vertex; and
determining the fourth length depending on the second entry.

17. The method according to claim 1 further comprising: providing a capacity constraint for the entity moving on the route, and either inserting the pick-up location into the route if the capacity of the entity meets the capacity constraint for at least the part of the route which is affected by inserting the pick-up location or not inserting the pickup location otherwise.

18. An apparatus for operating a plurality of autonomous transport vehicles,
comprising:
a device configured to perform the following:
providing, via a processor, a set of routes for moving entities of the at least one transport vehicle, wherein the set of routes is provided from a memory coupled to the processor;
providing a request for at least two stops of an entity of the moving entities of the plurality of autonomous transport vehicles, the at least two stops including at least one pick up location and at least one drop off location;
selecting, via the processor, a route from the set of routes so that a measure for a distance of one or more stops of the at least two stops included in the request to the route meets a condition;
inserting, via the processor, the at least one pick up location and the at least one drop off location as stops into the route;
determining, via the processor, instructions to operate the entity according to the route; and
operating, via the processor, the entity of the plurality of transport vehicles according to the route;
wherein the processor is couplable via a first data link with a first communication device,
wherein the first communication device is couplable via a second data link with a second communication device of the entity of the plurality of autonomous transport vehicles,
wherein a user of the entity of the at least one transport vehicle makes the request with a third communication device, wherein the first communication device is couplable via a third data link with the second communication device of the entity of the plurality of autonomous transport vehicles, and wherein the entity includes a user interface for an operator of the entity and/or a controller for controlling the entity, and
wherein the first data link connects at least temporarily the processor with the memory and the first communication device, and wherein the second data link connects at least temporarily the first communication device and the second communication device of the entity, and
wherein a shortest path distance from the pick-up location to the drop off location is computed with a contraction hierarchy search, wherein from the computed shortest path distance a latest time when the request is to be dropped off is calculated, and wherein a latest time when the request is to be picked up is computed.

19. A non-transitory computer-readable medium, on which is stored a computer program, which is executable by a processor, comprising:
  a program code arrangement having program code for operating a plurality of autonomous transport vehicles, by performing the following:
    providing, via the processor, a set of routes for moving entities of the plurality of autonomous transport vehicles, wherein the set of routes is provided from a memory coupled to the processor;
    providing a request for at least two stops of an entity of the transport vehicle, the at least two stops including at least one pick up location and at least one drop off location;
    selecting, via the processor, a route from the set of routes so that a measure for a distance of one or more stops of the at least two stops included in the request to the route meets a condition;
    inserting, via the processor, the at least one pick up location and the at least one drop off location as stops into the route;
    determining, via the processor, instructions to operate the entity according to the route; and
    operating, via the processor, the entity of the plurality of transport vehicles according to the route;
  wherein the processor is couplable via a first data link with a first communication device,
  wherein the first communication device is couplable via a second data link with a second communication device of the entity of the plurality of autonomous transport vehicles,
  wherein a user of the entity of the at least one transport vehicle makes the request with a third communication device, wherein the first communication device is couplable via a third data link with the second communication device of the entity of the plurality of autonomous transport vehicles, and wherein the entity includes a user interface for an operator of the entity and/or a controller for controlling the entity, and
  wherein the first data link connects at least temporarily the processor with the memory and the first communication device, and wherein the second data link connects at least temporarily the first communication device and the second communication device of the entity, and
  wherein a shortest path distance from the pick-up location to the drop off location is computed with a contraction hierarchy search, wherein from the computed shortest path distance a latest time when the request is to be dropped off is calculated, and
  wherein a latest time when the request is to be picked up is computed.

* * * * *